United States Patent
Cimatti et al.

(10) Patent No.: US 8,292,011 B2
(45) Date of Patent: Oct. 23, 2012

(54) HYBRID VEHICLE

(75) Inventors: Franco Cimatti, Pavullo (IT); Fabrizio Favaretto, Formigine (IT)

(73) Assignee: Ferrari S.p.A. (IT)

(*) Notice: Subject to any disclaimer, the term of this patent is extended or adjusted under 35 U.S.C. 154(b) by 227 days.

(21) Appl. No.: 12/877,663

(22) Filed: Sep. 8, 2010

(65) Prior Publication Data

US 2011/0083916 A1 Apr. 14, 2011

(30) Foreign Application Priority Data

Sep. 9, 2009 (IT) ................. BO2009A0573

(51) Int. Cl.
*B60K 6/42* (2007.10)
(52) U.S. Cl. ............................................. 180/65.22
(58) Field of Classification Search .......... 180/165, 180/65.22, 65.225, 65.25; 60/912; 165/41, 165/42, 43
See application file for complete search history.

(56) References Cited

U.S. PATENT DOCUMENTS

| | | | |
|---|---|---|---|
| 6,530,426 B1* | 3/2003 | Kishita et al. | 165/202 |
| 6,668,766 B1* | 12/2003 | Liederman et al. | 123/41.44 |
| 6,802,283 B2* | 10/2004 | Liederman et al. | 123/41.12 |
| 7,210,304 B2* | 5/2007 | Nagashima et al. | 62/259.2 |
| 2002/0112851 A1* | 8/2002 | O'Donnell | 165/202 |
| 2004/0261753 A1* | 12/2004 | Garabello et al. | 123/198 C |
| 2007/0137909 A1* | 6/2007 | Zillmer et al. | 180/65.2 |
| 2009/0107739 A1* | 4/2009 | Major et al. | 180/53.8 |
| 2010/0218918 A1* | 9/2010 | Sonohara | 165/104.31 |

FOREIGN PATENT DOCUMENTS

| | | |
|---|---|---|
| FR | 2923420 A1 | 5/2009 |
| JP | 2004239155 A | 8/2004 |

OTHER PUBLICATIONS

"Italian Application U.S. Appl. No. IT BO20090573, Search Report dated Mar. 4, 2010", 3 pgs.

* cited by examiner

*Primary Examiner* — John Walters
*Assistant Examiner* — James Triggs
(74) *Attorney, Agent, or Firm* — Schwegman Lundberg & Woessner, P.A.

(57) ABSTRACT

A vehicle with hybrid drive having: a thermal engine provided with a drive shaft and having a block which houses the drive shaft and two heads which house the cylinders and are arranged in a "V" configuration; a cooling system provided with a hydraulic circuit in which a cooling fluid flows; a reversible electric machine placed above the block of the thermal engine and between the two heads; an auxiliary device; a mechanical transmission which connects the first electric machine, the auxiliary device and the drive shaft of the thermal engine to one another; and a freewheel interposed between the first mechanical transmission and the drive shaft of the thermal engine; the hydraulic circuit of the cooling system has a main branch which cools the thermal engine, and a secondary branch which is connected as an offtake to the main branch and cools the first electric machine; the secondary branch is connected as an offtake to the main branch by an inlet pipe and by an outlet pipe, which extend downwards from a lower wall of the electric machine to corresponding openings obtained through the block of the thermal engine.

10 Claims, 10 Drawing Sheets

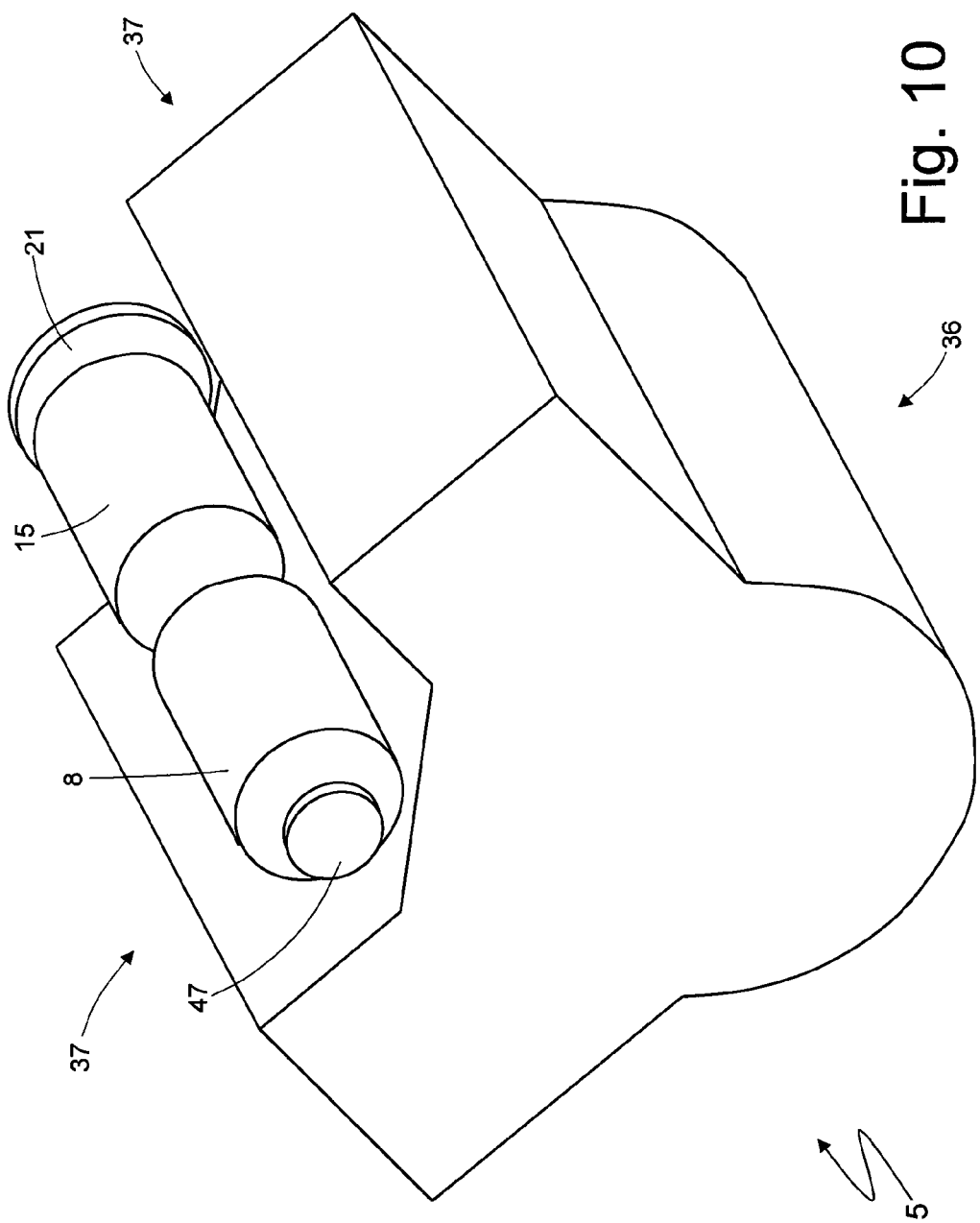

HYBRID VEHICLE

RELATED APPLICATIONS

This application claims priority, under 35 U.S.C. Section 119, to Italian Patent Application Serial No. BO2009A000573 filed on Sep. 9, 2009, which is incorporated herein by reference in its entirety.

TECHNICAL FIELD

The present document relates to a hybrid vehicle.

BACKGROUND

A hybrid vehicle comprises an internal combustion thermal engine, which transmits torque to the driving wheels by means of a transmission provided with a gearbox, and at least one electric machine which is supplied by an electronic power converter and is mechanically connected to the driving wheels. The electric machine is controlled by an electric control connected to an electric storage system typically consisting of a chemical battery pack possibly parallel connected to one or more super-capacitors.

When the vehicle is running, the following may occur: a heat operating mode, in which the torque is generated by the thermal engine only, and the electric machine possibly operates as a generator to recharge the electric storage system; an electric operating mode, in which the thermal engine is switched off and the torque is generated by the electric machine operating as an engine only; or a combined operating mode, in which the torque is generated both by the thermal engine and by the electric machine operating as an engine. Moreover, to increase the overall energy efficiency during all deceleration steps, the electric machine may be used as a generator to carry out a regenerative deceleration in which the kinetic energy held by the vehicle is partially converted into electric energy which is stored in the electric storage system, rather than being completely dissipated into friction.

The placement of the electric machine inside the vehicle, and therefore, the mechanical connection of the electric machine to the driving wheels may be very complex in an existing vehicle, as finding the space required to house the electric machine is generally very difficult in an existing vehicle which has not been specifically designed for hybrid drive. Accordingly, modifying an existing vehicle to make the vehicle itself hybrid is often impossible; such a limitation is particularly serious as it does not permit to produce a hybrid vehicle from an existing vehicle of conventional type, but it requires a completely new design of the hybrid vehicle. Accordingly, the design and development costs of a hybrid vehicle are high, thus making the hybrid vehicles not very economically affordable on the market.

A hybrid vehicle comprises a cooling system, which the present inventors have recognized should be capable of cooling both the thermal engine, and the electric machine. The cooling system is generally complex and cumbersome, and especially difficult to be installed when the vehicle is not created for hybrid drive from the beginning, but is obtained by adding an electric machine to an existing vehicle with thermal drive alone.

Another problem which occurs in a hybrid vehicle created by adding an electric machine to an existing vehicle with thermal drive alone is how to activate the auxiliary devices (e.g. the servo-brake pump, the power steering pump, the air conditioner compressor . . . ) in case of purely electric drive or when the vehicle is stopped in "Start&Stop" mode (e.g., when thermal engine 5 is switched off), as all the auxiliary devices take the motion from the drive shaft of the thermal engine.

US2004261753A1 discusses a vehicle with hybrid drive having: a thermal engine provided with a drive shaft; a reversible electric machine; an auxiliary device consisting of an air conditioner compressor; a mechanical belt transmission which connects the electric machine, the auxiliary device and the drive shaft of the thermal engine to one another; and a freewheel interposed between the mechanical transmission and the drive shaft of the thermal engine.

Overview

It can be an object of the present invention to provide a hybrid vehicle, which is free from the above-described drawbacks while being easy and cost-effective to be implemented.

According to an embodiment of the present invention, a hybrid vehicle is provided as claimed in the attached claims.

BRIEF DESCRIPTION OF THE DRAWINGS

Embodiments of the present invention will now be described with reference to the accompanying drawings, which illustrate some non-limiting embodiments thereof, in which:

FIG. 10 is a diagrammatic, perspective view of a thermal engine of the vehicle in FIG. 7 coupled with the auxiliary shafts in FIG. 9.

DETAILED DESCRIPTION

Figure 1:
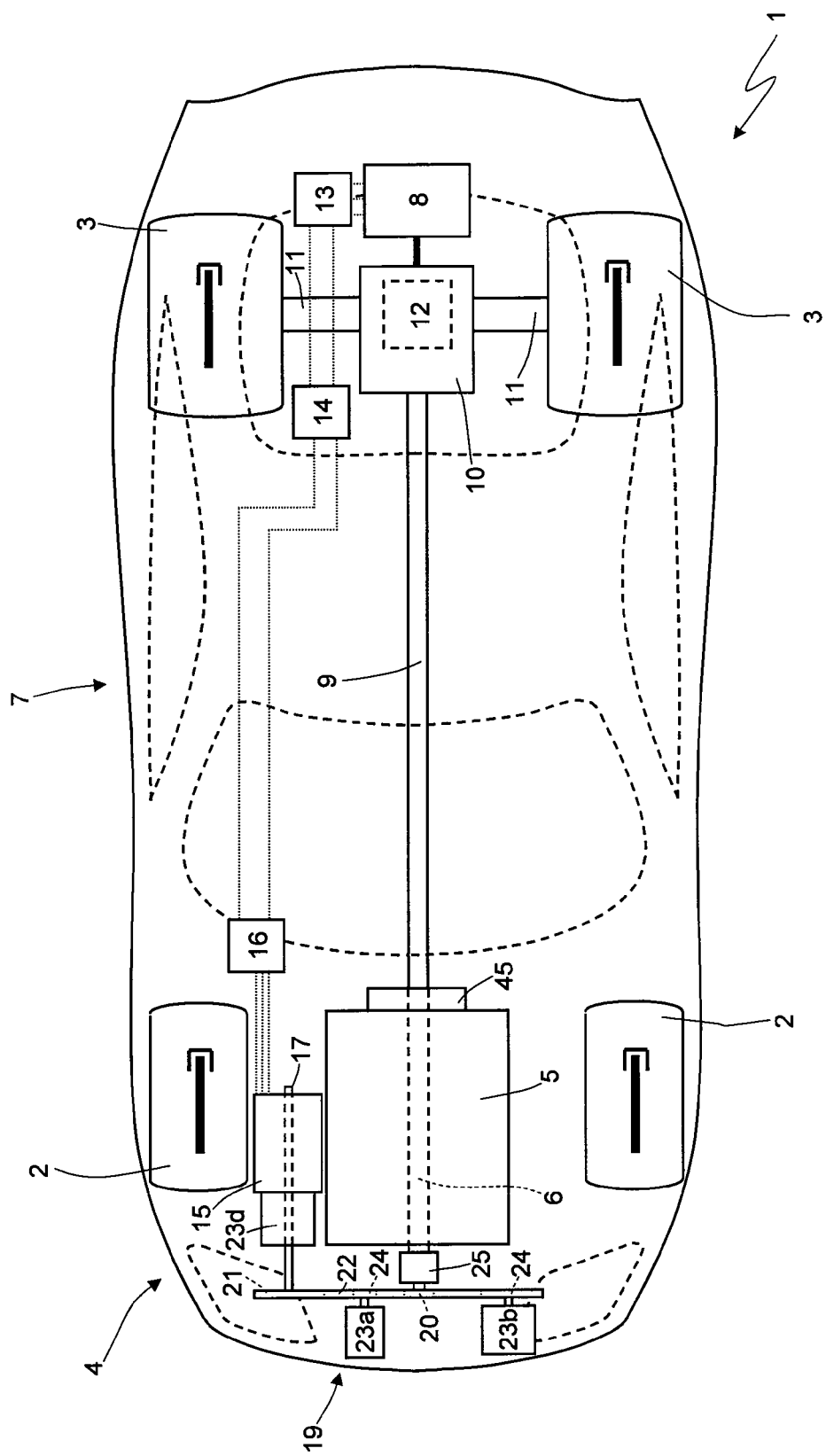
FIG. 1 is a diagrammatic view of a road vehicle with hybrid propulsion.

In FIG. 1, reference numeral 1 indicates as a whole a road vehicle with hybrid propulsion provided with two front wheels 2 and two rear driving wheels 3, which receive the torque from a hybrid motor propulsion system 4.

In an example, the hybrid motor propulsion system 4 comprises an internal combustion thermal engine 5, which is arranged in forward position and is provided with a drive shaft 6; an automatic manual transmission 7 (sometimes called "AMT"), which transmits the torque generated by the thermal engine 5 towards the rear driving wheels 3; and a main reversible electric machine 8 (e.g., capable of operating both as an electric engine by absorbing electric energy and generating a mechanical torque, and as an electric generator by absorbing mechanical energy and generating electric energy) which is mechanically connected to transmission 7.

In an example, transmission 7 comprises a transmission shaft 9 which on the one hand is angularly integral with the drive shaft 6 and on the other hand is mechanically connected to a double-clutch gearbox 10, which is arranged in rear position and transmits the motion to the rear driving wheels 3 by means of two axle shafts 11 which receive the motion from a differential 12. The main electric machine 8 is mechanically connected to the double-clutch gearbox 10 (in particular, the shaft of the main electric machine 8 is angularly integral with one of the two primary shafts of the double-clutch gearbox 10) and is controlled by an electronic power converter 13 connected to a storage system 14 which is adapted to store electric energy and is provided with chemical batteries and/or super-capacitors.

In an example, the hybrid motor propulsion system 4 comprises a secondary reversible electric machine 15 which is mechanically connected to the drive shaft 6 of thermal engine 5 and is controlled by an electronic power converter 16 connected to the storage system 14 (which thus is in common to both the electric machines 8 and 15). In particular, the hybrid motor propulsion system 4 comprises an auxiliary shaft 17, which is pivotally mounted to rotate about a rotation axis 18 (shown in FIG. 2), is arranged parallel and next to the drive shaft 6 of thermal engine 5 and supports the secondary electric machine 15. Auxiliary shaft 17 is connected to the drive shaft 6 of thermal engine 5 by means of a mechanical belt transmission 19 (or, according to equivalent art, a mechanical chain transmission) which comprises a pulley 20 connected to drive shaft 6, a pulley 21 integral with the auxiliary shaft 17 and a belt 22 wound in a ring shape between the pulleys 20 and 21.

Furthermore, mechanical transmission 19 brings auxiliary devices 23 of vehicle 1 into rotation (i.e. provides the motion thereto); in particular, each auxiliary device 23 is integral with an integral pulley 24 thereof which engages the belt 22 of the mechanical transmission 19. Only part of the auxiliary devices 23 is diagrammatically shown in FIG. 1; for example, the auxiliary devices 23 may comprise a power steering pump 23a, a servo-brake pump 23b and a circulation pump 23c (shown in FIG. 2) for a cooling fluid of a cooling system of thermal engine 5. Interposed between the drive shaft 6 of thermal engine 5 and the pulley 20 is a freewheel 25 (or idle wheel 25) which transmits the motion (e.g., engages) when it rotates in a certain direction and does not transmit the motion (e.g., it does not engage) when it rotates in the opposite direction. Due to the presence of freewheel 25, the drive shaft 6 transmits some torque to the belt 22 of the mechanical transmission 19 when thermal engine 5 is switched on, while it leaves the belt 22 to freely rotate when thermal engine 5 is switched off.

In an example, the secondary electric machine 15 is crossed by the auxiliary shaft 17: according to a first embodiment, the rotor of the secondary electric machine 15 is directly fixed to the auxiliary shaft 17 which thus also is the shaft of the secondary electric machine 15 (in this case the auxiliary shaft 17 is monolithic, e.g., it has no intermediate joint), or according to a different embodiment, the shaft of the secondary electric machine 15 is butt-jointed at both sides to the auxiliary shaft 17 and is an integral part of the auxiliary shaft 17 itself (in this case the auxiliary shaft 17 consists of several parts butt-jointed to one another).

Vehicle 1 is provided with an air-conditioning system for the passenger compartment, which has an air conditioner which, by exploiting a compressed cooling cycle is capable of decreasing the temperature and/or humidity of the air which is inputted into the passenger compartment. The air conditioner comprises a compressor 23d of volumetric type, which is part of the auxiliary devices 23 and is activated by the secondary shaft 17 like the other auxiliary devices 23.

According to the embodiment shown in FIGS. 1-4, compressor 23d is directly connected to the auxiliary shaft 17 and in particular is crossed by the auxiliary shaft 17 and is arranged next to the secondary electric machine 15; according to a first embodiment, the rotor of compressor 23d is directly fixed to the auxiliary shaft 17 which thus also is the shaft of compressor 23d (in this case the auxiliary shaft 17 is monolithic, i.e. it has no intermediate joint), or according to a different embodiment, the shaft of compressor 23d is butt-jointed at both sides to the auxiliary shaft 17 and is an integral part of the auxiliary shaft 17 itself (in this case the auxiliary shaft 17 consists of several parts butt-jointed to one another). According to a different embodiment shown in FIG. 5, compressor 23d receives the motion from belt 22 of the mechanical transmission 19, similarly to the other auxiliary devices 23.

According to the embodiment shown in FIGS. 1-5, compressor 23d is a variable-displacement compressor and constantly meshes (possibly with the interposition of the auxiliary shaft 17 as shown in FIGS. 1-4) with the belt 22 of the mechanical transmission 19 (e.g., it is never separated from belt 22); in other words, compressor 23d is always brought into rotation by the belt 22 and the displacement of compressor 23d is varied between zero and a nominal value according to the requirements of the air conditioner. According to a different embodiment (not shown), compressor 23d has a fixed displacement and receives the motion from the belt 22 of the mechanical transmission 19 (possibly with the interposition of the auxiliary shaft 17 as shown in FIGS. 1-4) through a coupling member (e.g. of electromagnetic type) so that the compressor 23d is only connected to the belt 22 when required.

Figure 3:
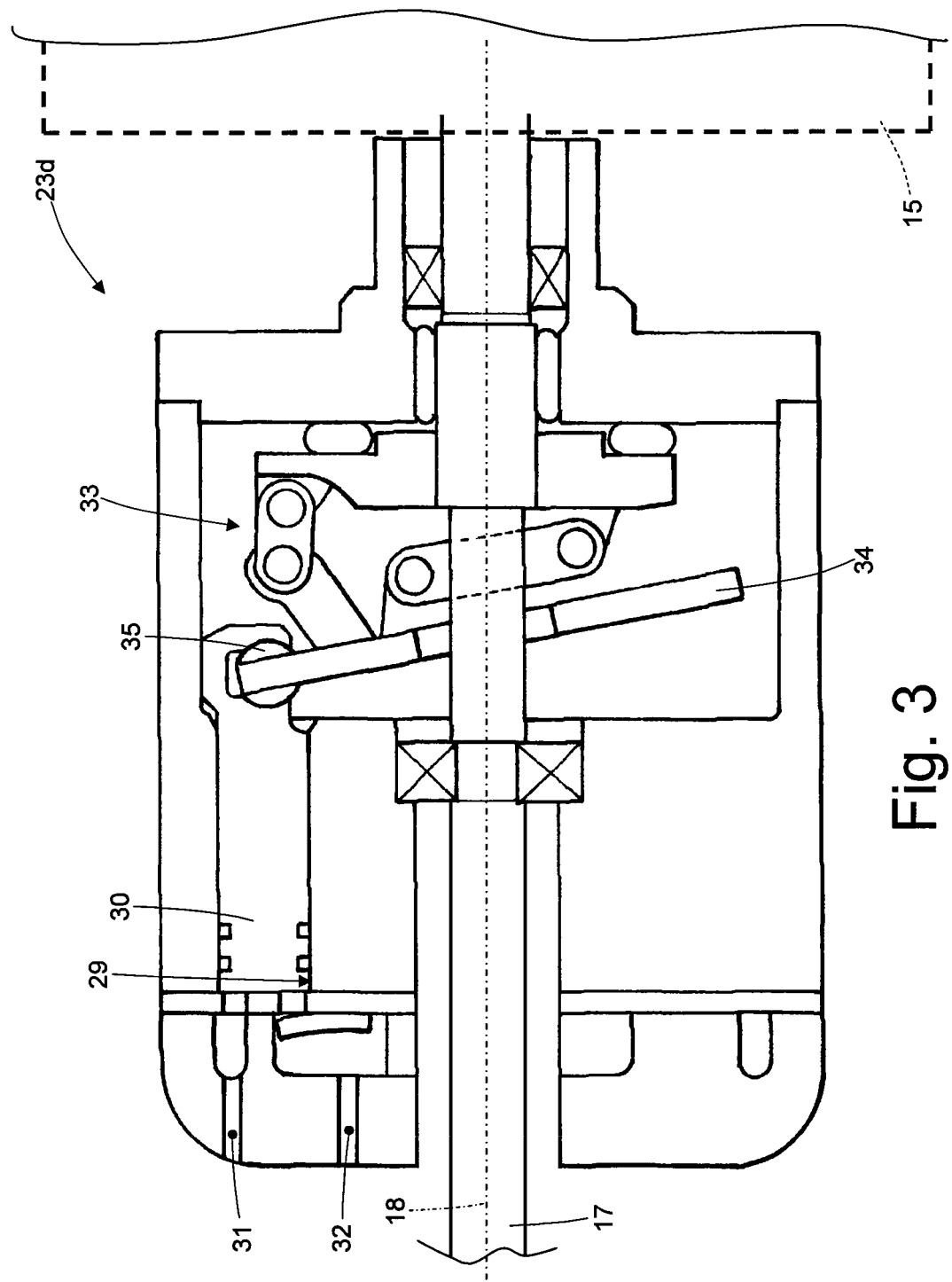
FIG. 3 is a diagrammatic, side-section view of the compressor in FIG. 2, with parts removed for clarity.

As shown in FIG. 3, compressor 23d is a variable-displacement compressor (e.g. of the type described in patent application EP1970566A2) and comprises at least one cylinder 29 (which forms a compression chamber), in which a piston 30 axially runs between a top dead point (shown in FIG. 3) at which the internal volume of cylinder 29 is minimum, and a bottom dead point at which the internal volume of cylinder 29 is maximum. On the ceiling of cylinder 29 there are a suction or inlet opening 31 for a cooling fluid, provided with a one-way inlet valve, and a delivery or outlet opening 32 for the cooling fluid provided with a one-way outlet valve. Cylinder 29 receives the reciprocating motion from the rotation of the auxiliary shaft 17 by means of an actuator mechanism 33, which rotates integrally with the auxiliary shaft 17 and is provided with a plate 34 which is pivotally mounted to vary its inclination with respect to the auxiliary shaft 17 and is connected to piston 30 by means of a spherical joint 35. Accordingly, by varying the inclination of plate 34 with respect to the auxiliary shaft 17 (e.g., using an electric step engine) the travel of piston 30 is varied, which piston 30 receives the motion from plate 34, and therefore the useful cylinder capacity (e.g., the displacement) of compressor 23d is varied.

Figure 4:
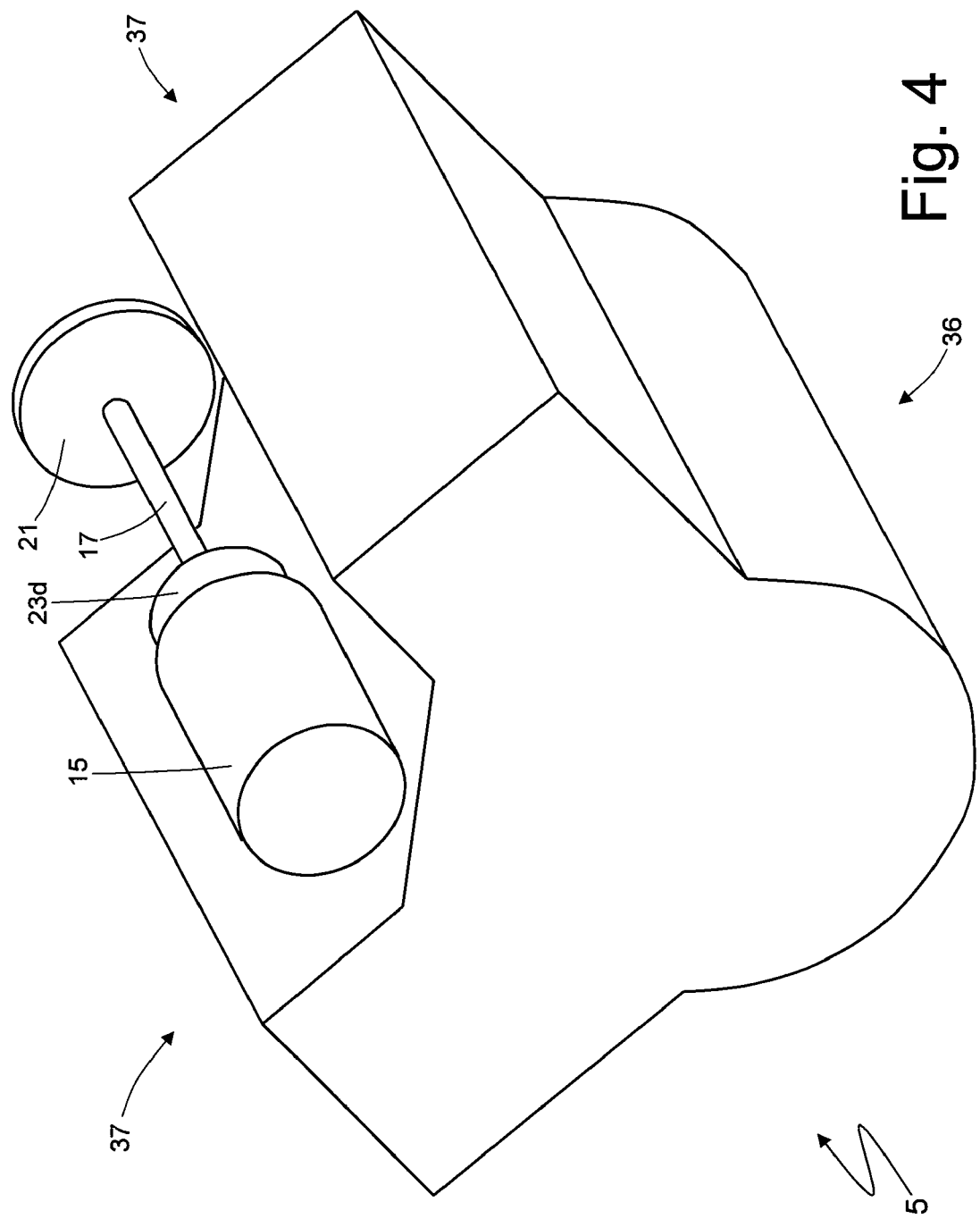
FIG. 4 is a diagrammatic, perspective view of a thermal engine of the vehicle in FIG. 1 coupled with the auxiliary shaft in FIG. 2.
Figure 5:
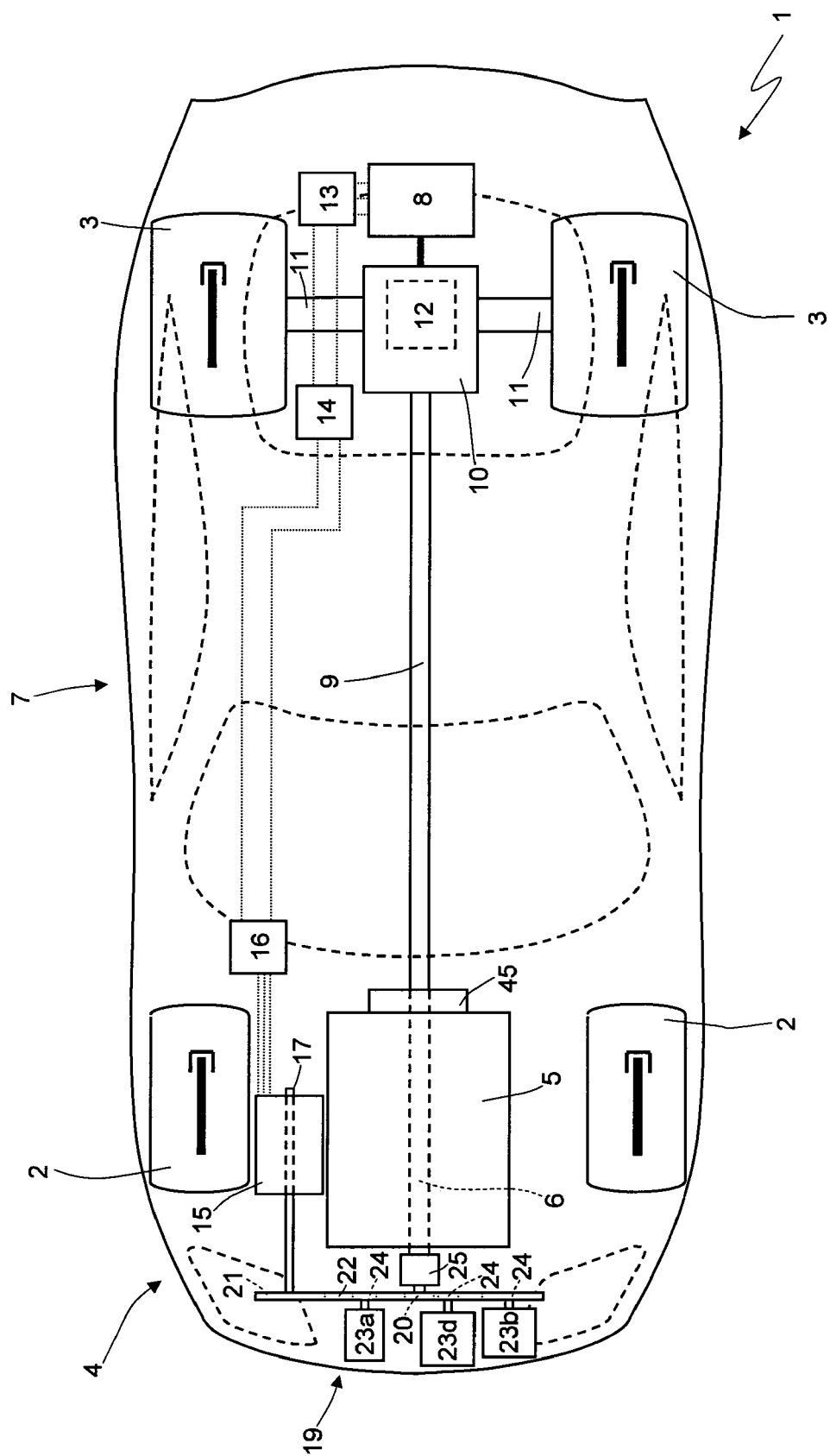
FIGS. 5-8 are diagrammatic views of just as many variants of the vehicle in FIG. 1.

As shown in FIG. 4, thermal engine 5 comprises a block 36 which houses the drive shaft 6 and two heads 37, which house the cylinders and are arranged in a "V" configuration with a 90° angle between the heads 37. The auxiliary shaft 17 (along with the secondary electric machine 15 and the compressor 23d which are mounted to the auxiliary shaft 17) is located above the block 36 of thermal engine 5 and between the two heads 37, e.g., in the gap laterally delimited by the two heads 37 arranged in a "V" configuration. The mechanical transmission 19 is arranged in front of the front side of thermal engine 5, therefore the auxiliary shaft 17 protrudes from the thermal engine 5 at the front side of thermal engine 5 to be connected to pulley 21.

Figure 2:
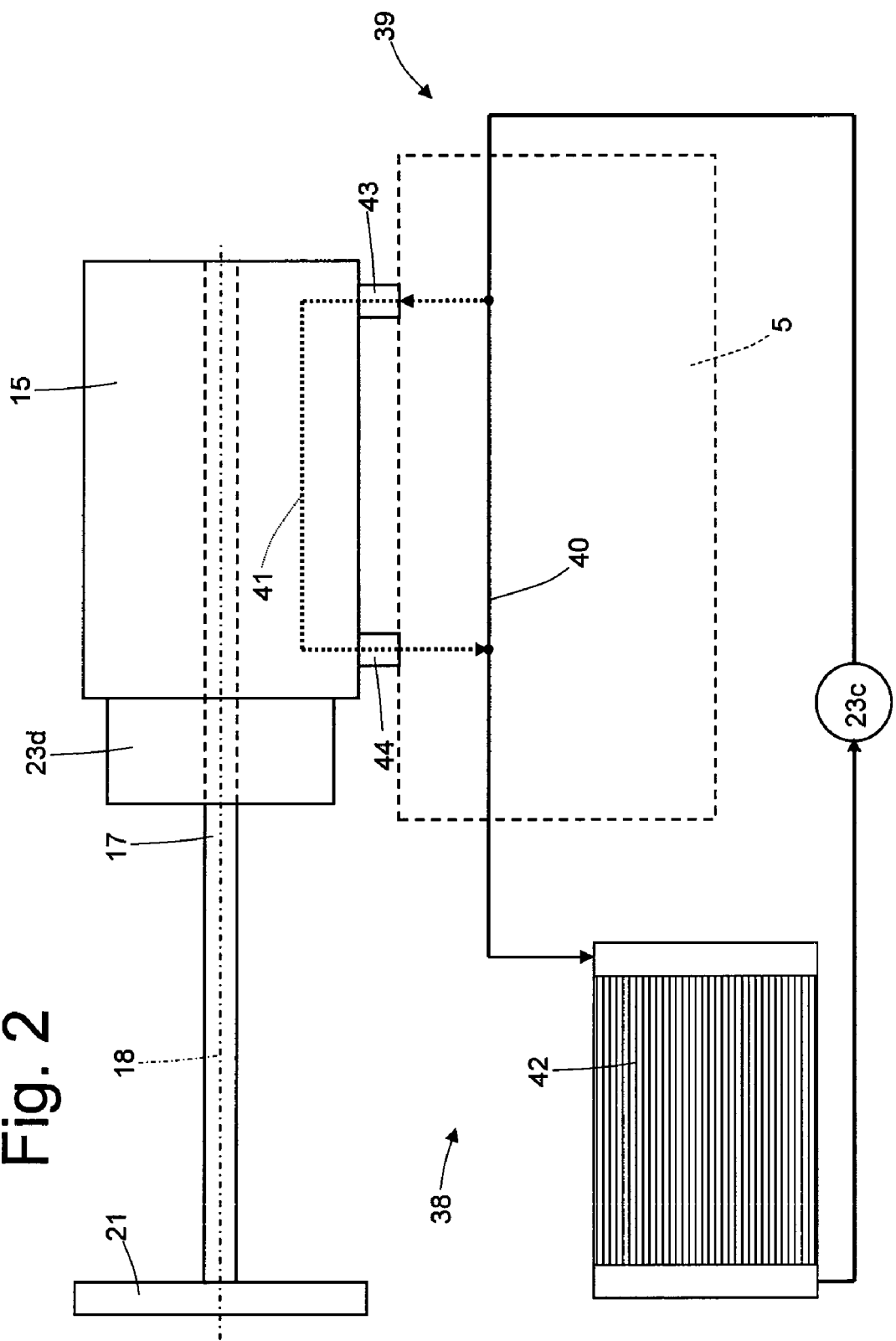
FIG. 2 is a diagrammatic view of an auxiliary shaft of the vehicle in FIG. 1 coupled with an electric machine and with a compressor of an air conditioning system.

As shown in FIG. 2, vehicle 1 comprises a cooling system 38, which has the task of cooling the thermal engine 5 and the secondary electric machine 15. The cooling system 38 comprises a hydraulic circuit 39 in which a cooling fluid flows, which typically consists of water mixed to an antifreeze additive. The hydraulic circuit 39 comprises a main branch 40 (shown with a continuous line) which cools the thermal engine 5, and a secondary branch 41 (shown with a dotted line) which is connected as an offtake (e.g., parallel) to the main branch 40 and cools the secondary electric machine 15.

The main branch 40 comprises at least one radiator 42 (e.g., a heat exchanger of the water/air type), which is arranged in forward position to be hit by the air when the vehicle 1 is moving, a labyrinth (diagrammatically shown in FIG. 2) which extends into thermal engine 5, and the circulation pump 23c which determines the circulation of the cooling fluid in the hydraulic circuit 39 is mechanically activated by the mechanical transmission 24 which takes motion from the auxiliary shaft 17, and is part of the auxiliary devices 23.

The secondary branch 41 comprises a labyrinth which extends into the secondary electric machine 15 (which may involve the stator alone or also the rotor) and is connected as an offtake (e.g., parallel) to the main branch 40 by an inlet pipe 43 and by an outlet pipe 44. Pipes 43 and 44 extend downwards from a lower wall of the secondary electric machine 15 to corresponding openings obtained through the block 36 of thermal engine 5.

According to a preferred embodiment shown in FIG. 1, coupled to the drive shaft 6 of thermal engine 5 is a starter 45, which serves the function of bringing the drive shaft 6 into rotation to start the thermal engine 5. The electric starter 45 is capable of applying a significant start torque to the drive shaft 6 of thermal engine 5 due to a high reduction ratio (e.g., even of 1:10) between the electric starter 45 and the drive shaft 6. It is worth noting that starter 45 may be needed, as the electric machines 8 and 15 may not be capable of applying a high torque to the stopped drive shaft 6 as required when starting a "cold" thermal engine 5.

Figure 6:
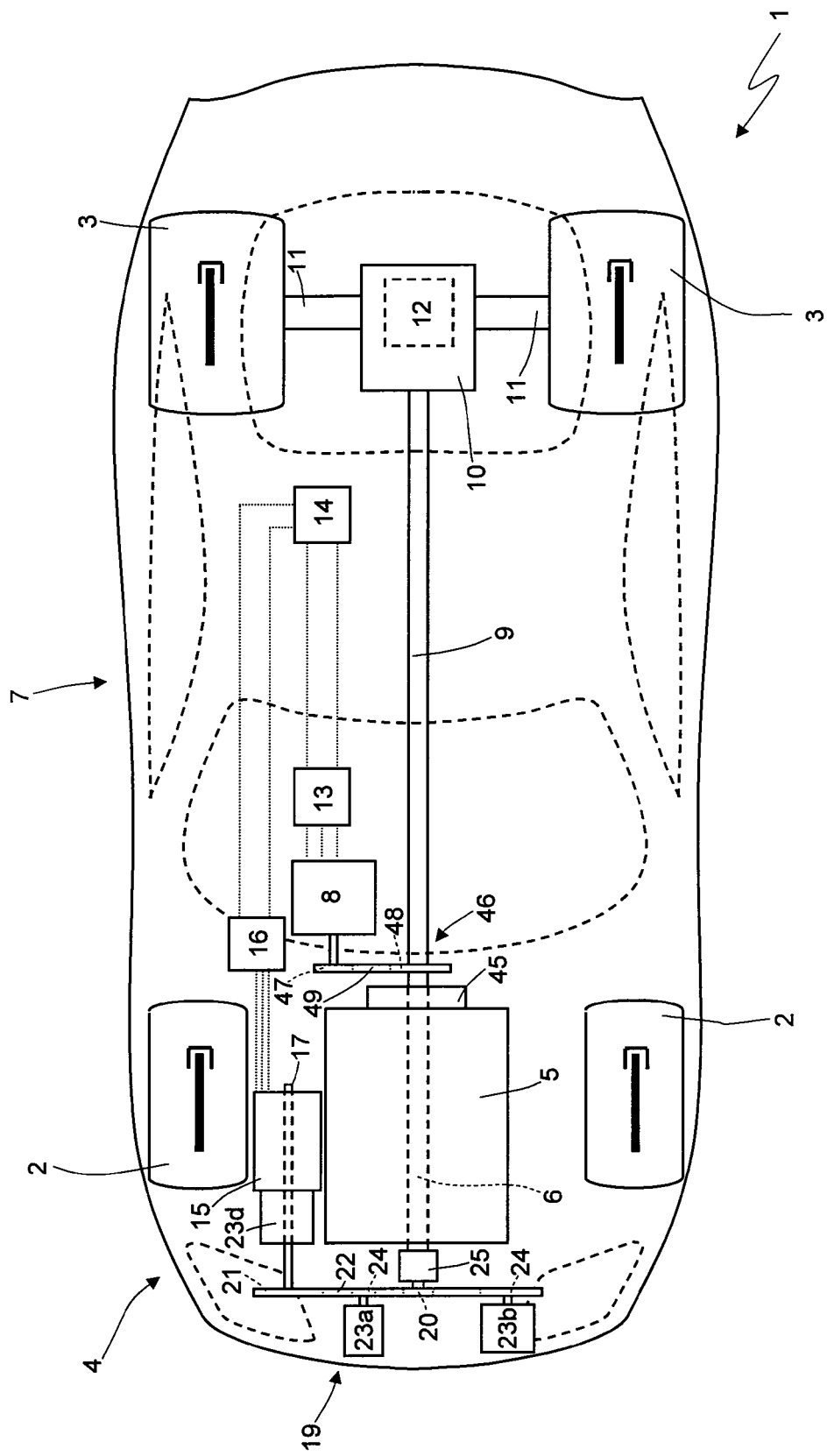
Figure 7:
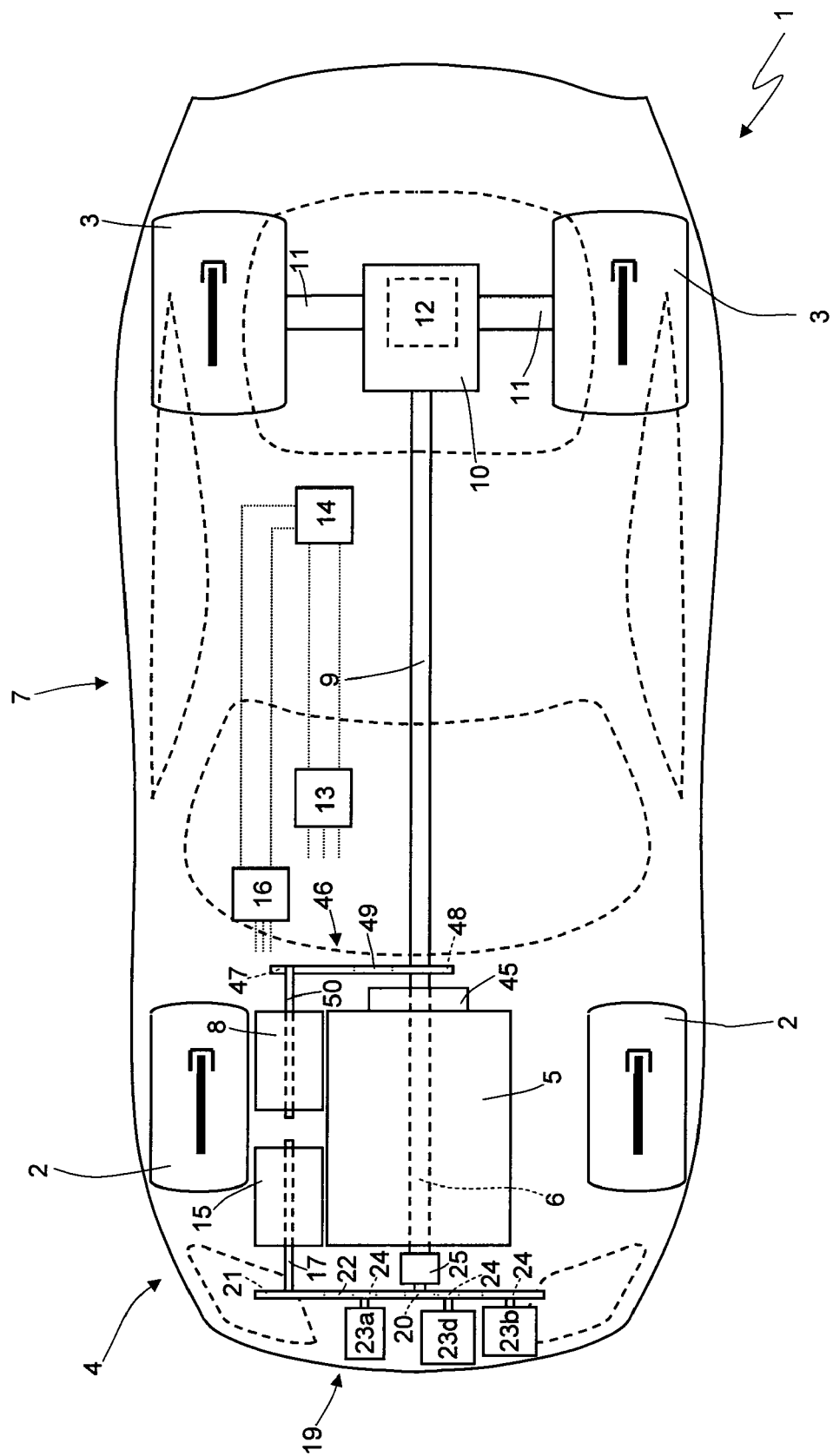

According to a different embodiment shown in FIGS. 6 and 7, the main electric machine 8 is mechanically connected to the drive shaft 6 (or to the transmission shaft 8) rather than being connected to gearbox 10.

In the embodiment shown in FIG. 6, the main electric machine 8 is mechanically connected to the drive shaft 6 (or to the transmission shaft 9) using a mechanical chain transmission 46 (or a mechanical belt transmission) which comprises a toothed wheel 47 integral with the shaft of the main electric machine 8, a toothed wheel 48 integral with the drive shaft 6 (or with the transmission shaft 9), and a chain 49 wound in a ring shape between the toothed wheels 47 and 48. According to a variant (not shown), rather than being a chain transmission (or, according to equivalent art, a belt transmission), the mechanical transmission 46 comprises a cascade of gears. In the variant shown in FIG. 7, similarly to the secondary electric machine 16, the main electric machine 8 is located above the block 36 of thermal engine 5 and between the two heads 37, i.e. in the gap laterally delimited by the two heads 37 arranged in a "V" configuration (as better shown in FIG. 10); in particular, a further auxiliary shaft 50 is provided, which is pivotally mounted to rotate about a rotation axis 51 (shown in FIG. 9), is arranged parallel and next to the drive shaft 6 of thermal engine 5, supports the secondary electric machine 15, and is connected to the drive shaft 6 (or to the transmission shaft 9) by means of the mechanical transmission 46. It is worth noting that the auxiliary shaft 50 may be a further shaft which is butt-jointed to the shaft of the main electric machine 8, or the auxiliary shaft 50 may consist of the shaft of the main electric machine 8.

As shown in FIG. 10, the auxiliary shaft 17 (along with the secondary electric machine 15) and the auxiliary shaft 50 (along with the main electric machine 8) are located next to each other above the block 36 of thermal engine 5 and between the two heads 37, e.g., in the gap laterally delimited by the two heads 37 arranged in a "V" configuration. The auxiliary shaft 17 laterally protrudes from the thermal engine 5 (e.g., at the front side of the thermal engine 5) to be connected to the mechanical transmission 19, while the auxiliary shaft 50 laterally protrudes from the thermal engine 5 at the opposite side with respect to the auxiliary shaft 17 (e.g., on the rear side of the thermal engine 5) to be connected to the mechanical transmission 46. Thereby, the two mechanical transmissions 19 and 46 are arranged at opposite sides of thermal engine 5 (e.g., on the front side and on the rear side of thermal engine 5) and are mechanically connected to opposite ends of drive shaft 6.

Figure 9:
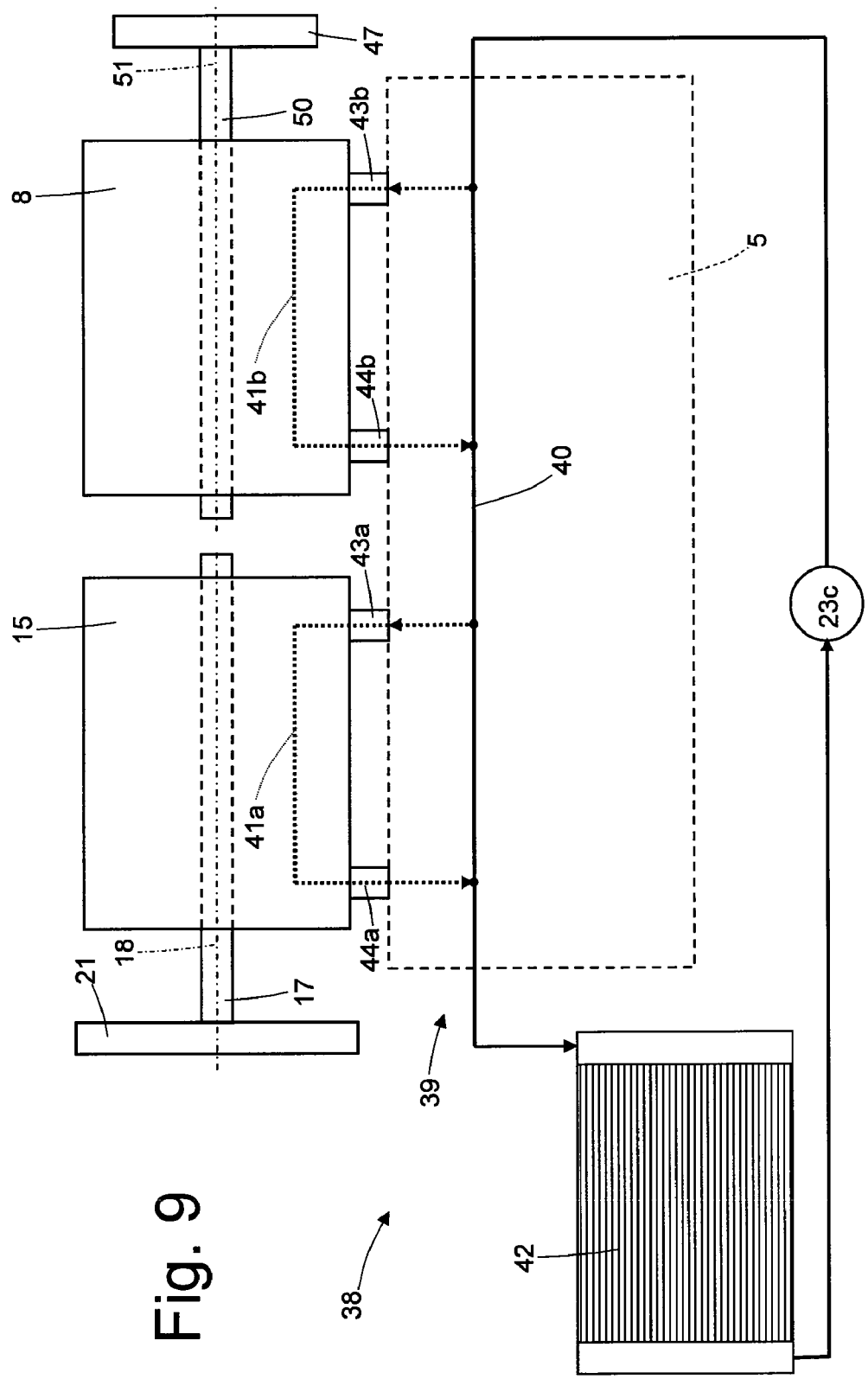
FIG. 9 is a diagrammatic view of two auxiliary shafts of the vehicle in FIG. 7 coupled with respective electric machines.

As shown in FIG. 9, the hydraulic circuit 39 of the cooling system 38 comprises two secondary branches 41a and 41b to cool the two electric machines 8 and 15. Each secondary branch 41a and 41b comprises a labyrinth which extends into the electric machine 8 or 15 (which may involve the stator alone or also the rotor) and is connected as an offtake (e.g., parallel) to the main branch 40 by an inlet pipe 43a or 43b and by an outlet pipe 44a or 44b. Pipes 43 and 44 extend downwards from a lower wall of the main electric machine 8 or of the secondary electric machine 15 to corresponding openings obtained through the block 36 of thermal engine 5.

Figure 8:
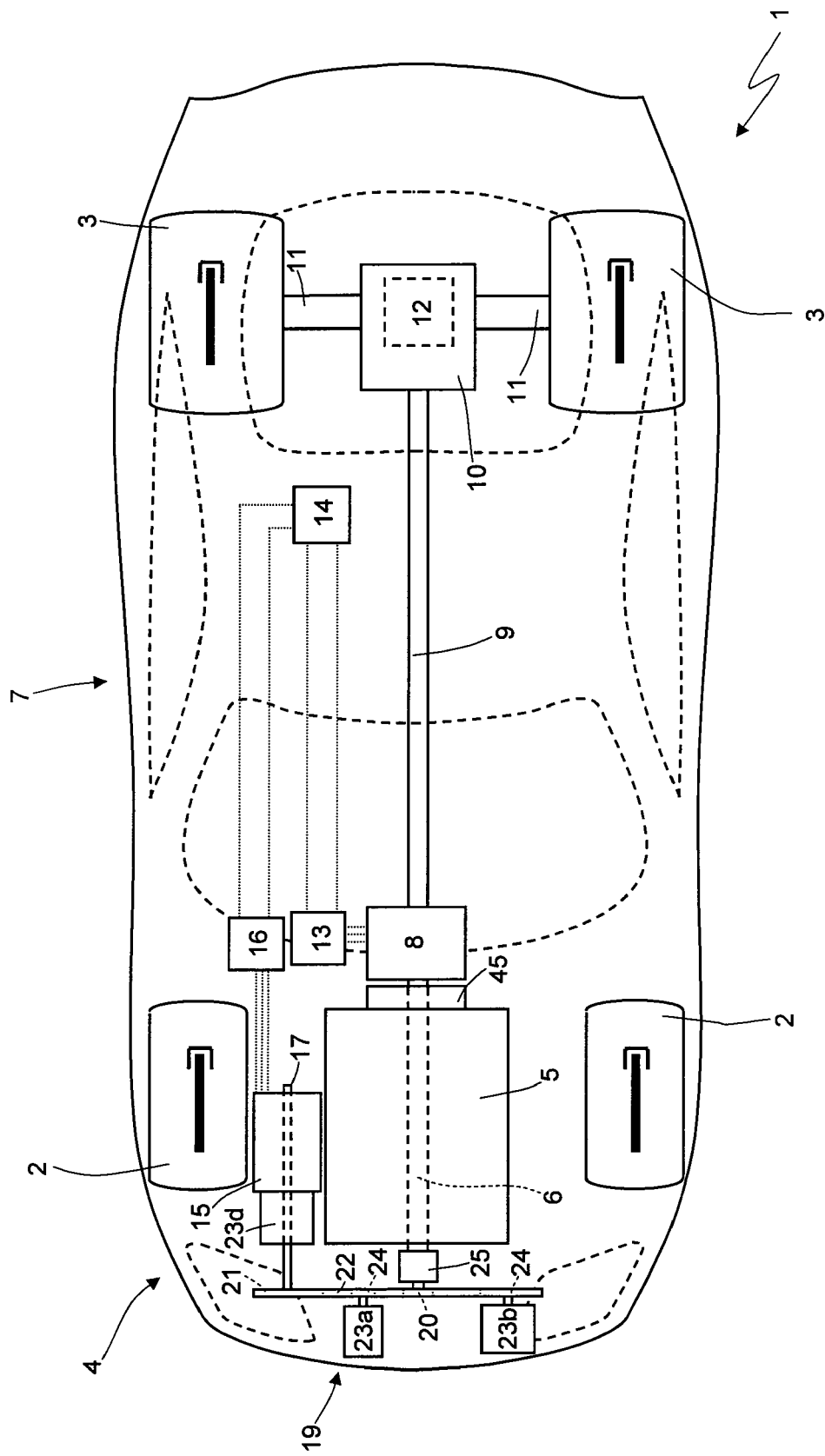

In the embodiment shown in FIG. 8, the main electric machine 8 is coaxial to the drive shaft 6 (or to the transmission shaft 9) and is directly mounted to the drive shaft 6 (or to the transmission shaft 9); in other words, the rotor of the main electric machine 8 is directly fixed to the drive shaft 6 (or to the transmission shaft 9) which thus also is the shaft of the main electric machine 8. In this embodiment, there is no mechanical transmission 46 as the main electric machine 8 is directly fitted onto the drive shaft 6 (or onto the transmission shaft 9).

According to a different embodiment (not shown), there is no main electric machine 8 and the secondary electric machine 15 is the only electric machine of vehicle 1.

Examples of the operating modes of the electric machines 8 and 15 are described below.

When thermal engine 5 is on, the belt 22 of the mechanical transmission 19 is dragged by the drive shaft 6 of thermal engine 5 (therefore the auxiliary devices 23 receive the motion from the drive shaft 6 of thermal engine 5). Moreover, when thermal engine 5 is on, the electric machines 8 and 15 may be switched off, may operate as a generator to generate electric energy intended to recharge the storage system 14, or may operate as an engine to generate torque intended to activate the auxiliary devices 23 and/or to contribute to the motion of vehicle 1 by being added to the torque generated by the thermal engine 5.

When thermal engine 5 is off, the secondary electric machine 15 operates as an engine (when required) to generate torque intended to activate the auxiliary devices 23; the belt 22 of the mechanical transmission 19 may freely rotate also when the drive shaft 6 of thermal engine 5 is stopped, due to the action of the freewheel 25. Moreover, when thermal engine 5 is off, the main electric machine 8 may operate as an engine to generate torque intended to move the vehicle 1 (thus making a purely electric drive), or may operate as a generator during regenerative braking (the secondary electric machine 15 is not normally used during regenerative braking as thermal engine 5 also requires the connection to the driving wheels 3 to receive the motion from the driving wheels 3).

When thermal engine 5 is off and should be started, the torque required to bring the drive shaft 6 of thermal engine 5 into rotation may be supplied by the starter 45 and by the main electric machine 8 but not by the secondary electric machine 15 (the freewheel 25 does not permit the torque transmission from the belt 22 of the mechanical transmission 19 to the drive shaft 6 of thermal engine 5). When the thermal engine 5 is "cold", starting the thermal engine 5 requires the application of a very high start torque to the drive shaft 6, as the lubricating oil inside the thermal engine 5 is not very fluid due to the low temperature, and therefore it opposes high mechanical resistance; instead, when the thermal engine 5 is "hot", a relatively modest start torque (indicatively even 2-4 times smaller than the start torque required to start the "cold" thermal engine 5) is sufficient upon starting. Therefore, according to the start torque which is estimated to be required, the decision is made about how many and which of the two electric machines (the starter 45 and the main electric machine 8) supply the start torque; obviously, when thermal engine 5 should be started, the secondary electric machine 15 may not provide torque to the drive shaft 6 of thermal engine 5, but may drag the auxiliary devices 23 so as that all the torque supplied to the drive shaft 6 of thermal engine 5 is used to accelerate the drive shaft 6. It is worth noting that the starter 45 may be undersized as compared to a standard starter 45 working alone, due to the fact that the start torque may also be supplied by the main electric machine 8 while the secondary electric machine 15 may take on dragging the auxiliary devices 23.

The above-described vehicle 1 can provide various advantages, such as the examples described below.

Firstly, the cooling of the auxiliary electric machine 15 is simple and cost-effective also when vehicle 1 is not created for hybrid drive from the beginning, but is obtained by adding the electric machines 8 and 15 to an existing vehicle with thermal drive alone; in particular, making two openings on the ceiling of the block 36 of thermal engine 5 at the pipes 43 and 44 of the auxiliary electric machine 15 is the only modification required to make the secondary branch 41 (intended to cool the auxiliary electric machine 15) of the hydraulic circuit 39 of the cooling system 38. Such a result is achieved due to the location of the auxiliary electric machine 15 and possibly also of the main electric machine 8 between the two heads 37 of thermal engine 5.

Furthermore, locating the auxiliary electric machine 15 and possibly also of the main electric machine 8 between the two heads 37 of thermal engine 5 also permits the excellent exploitation of the spaces existing in the engine compartment, as it permits the auxiliary electric machine 15 and possibly the main electric machine 8 to be installed in a space available without requiring complex modifications, even in a vehicle which is created with thermal drive alone. It is worth noting that, due to the mechanical transmission 19, the auxiliary electric machine 15 may transmit the motion to all the auxiliary devices without substantially modifying the original location of the auxiliary devices (which are connected to respective hydraulic circuits as mentioned above).

Finally, due to the mechanical transmission 19 provided with the freewheel 25, all the auxiliary devices 23 may be actuated when thermal engine 5 is off, i.e. in the case of purely electric drive or when the vehicle is stopped in "Start&Stop" mode.

It is worth noting that the activation of the auxiliary devices 23 is particularly efficient in terms of energy, as when thermal engine 5 is on (e.g., over most of the time vehicle 1 is used), using part of the torque generated by the thermal engine 5 is more efficient to directly activate the auxiliary devices 23, rather than converting part of the torque generated by thermal engine 5 into electric energy which is re-transformed into mechanical torque by the secondary electric machine 15.

The invention claimed is:

1. Vehicle with hybrid drive comprising:
    a thermal engine provided with a drive shaft and presenting a block which houses the drive shaft and two heads which house the cylinders and are arranged in a "V" configuration;
    a cooling system provided with a hydraulic circuit inside which a cooling fluid flows;
    a first reversible electric machine;
    at least one auxiliary device;
    a first mechanical transmission which connects the first electric machine, the auxiliary device and the drive shaft of the thermal engine to each other; and
    a freewheel interposed between the first mechanical transmission and the drive shaft of the thermal engine;
    wherein the first electric machine is located above the block of the thermal engine between the two heads;
    wherein the hydraulic circuit of the cooling system comprises a main branch which cools the thermal engine and a secondary branch which is connected as an offtake to the main branch and cools the first electric machine; and
    wherein the secondary branch is connected as an offtake to the main branch using an inlet pipe and an outlet pipe, which extend toward downwards from a lower wall of the first electric machine up to corresponding openings obtained through the block of the thermal engine.

2. Vehicle according to claim 1, wherein the first mechanical transmission is a belt transmission and comprises:
    a first pulley, connected to the drive shaft using the interposition of the freewheel;
    a second pulley, integral to the first electric machine;
    a third pulley, integral to the auxiliary device; and
    a belt wound in a ring shape between the pulleys.

3. Vehicle according to claim 1 and comprising:
    an auxiliary shaft which supports the first reversible electric machine and is connected to the first mechanical transmission; and
    a compressor of an air conditioner which is supported by the auxiliary shaft and is arranged next to the first electric machine.

4. Vehicle according to claim 3, wherein the compressor is a variable-displacement compressor and meshes constantly with the auxiliary shaft.

5. Vehicle according to claim 1 and comprising:
    a second reversible electric machine; and
    a second mechanical transmission which connects the second electric machine and the drive shaft of the thermal engine to each other.

6. Vehicle according to claim 5, wherein the two mechanical transmissions are arranged in correspondence of opposite sides of the thermal engine and are mechanically connected to opposite ends of the drive shaft.

7. Vehicle according to claim 5, wherein the second electric machine is located next to the first electric machine, above the block of the thermal engine and between the two heads.

8. Vehicle according to claim 7, wherein the hydraulic circuit of the cooling system comprises two secondary branches, each of which is connected as an offtake to the main branch and cools a corresponding electric machine;
    each secondary branch is connected as an offtake to the main branch using an inlet pipe and an outlet pipe, which extend towards downwards from a lower wall of the corresponding electric machine up to corresponding openings obtained through the block of the thermal engine.

9. Vehicle according to claim 1 and comprising:
a transmission which transmits the torque generated by the thermal engine to driving wheels; and
a second reversible electric machine which is mechanically connected to the transmission.

10. Vehicle according to claim 1 and comprising a starter which is coupled to the drive shaft of the thermal engine using a high reduction ratio.

* * * * *